UNITED STATES PATENT OFFICE.

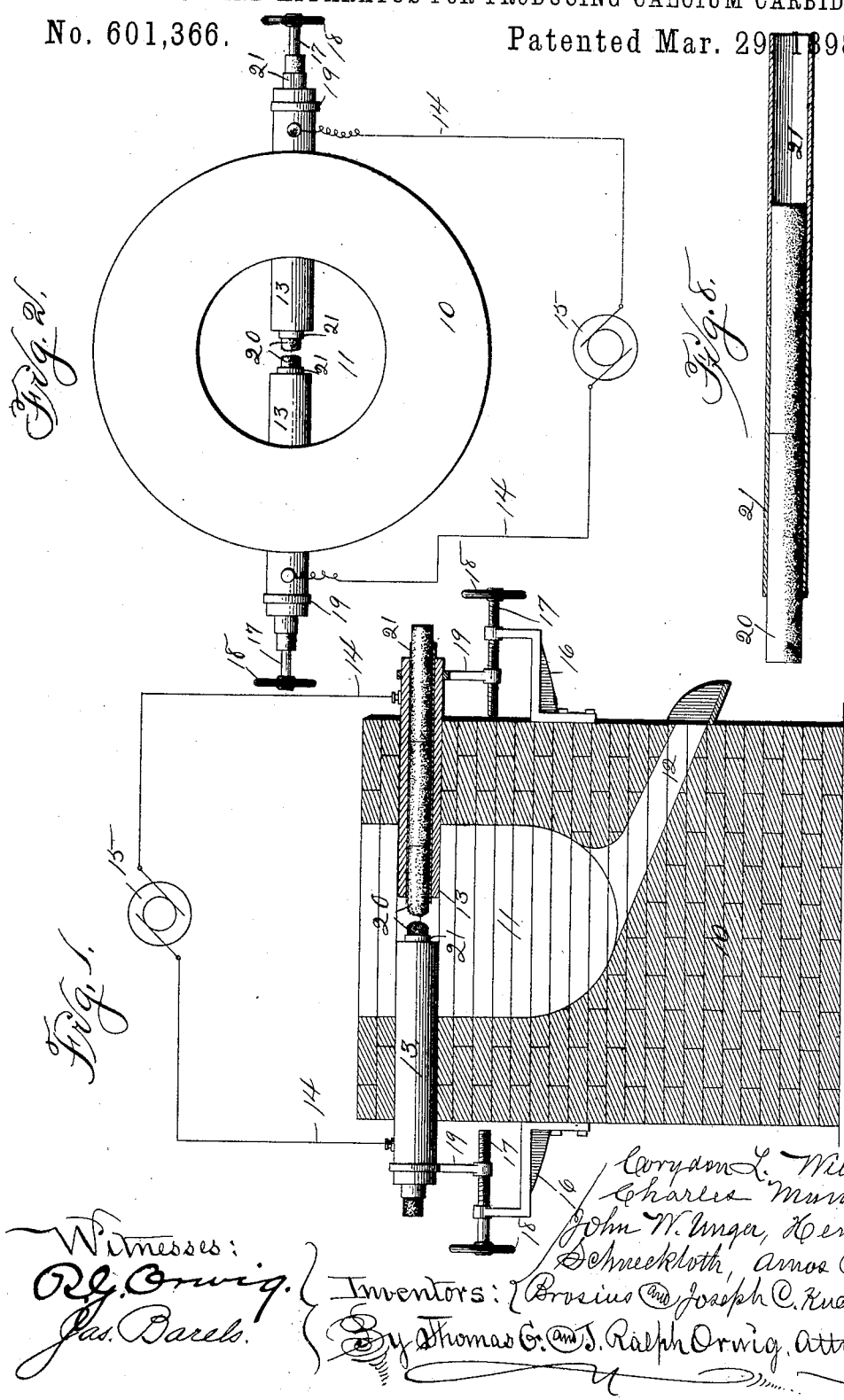

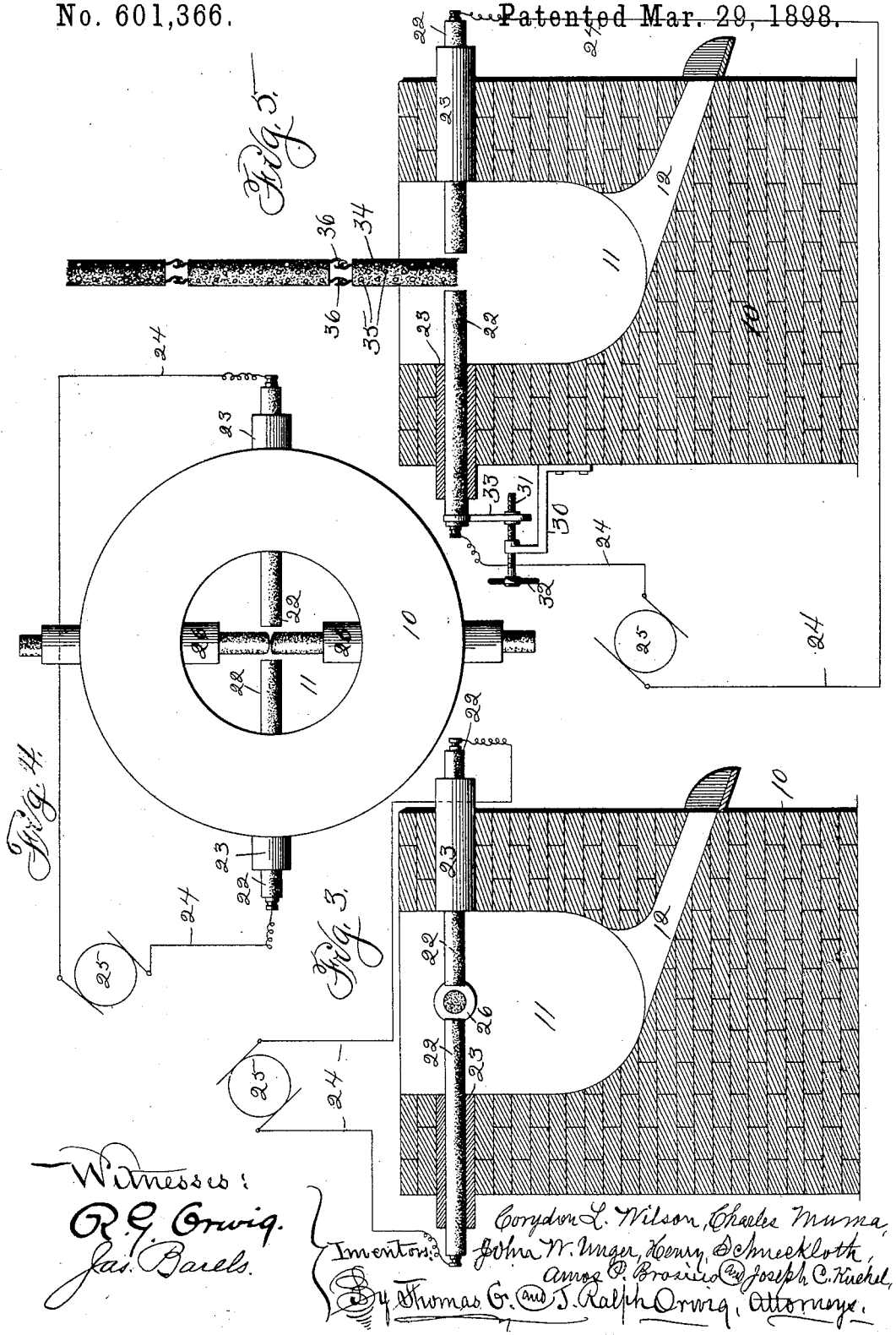

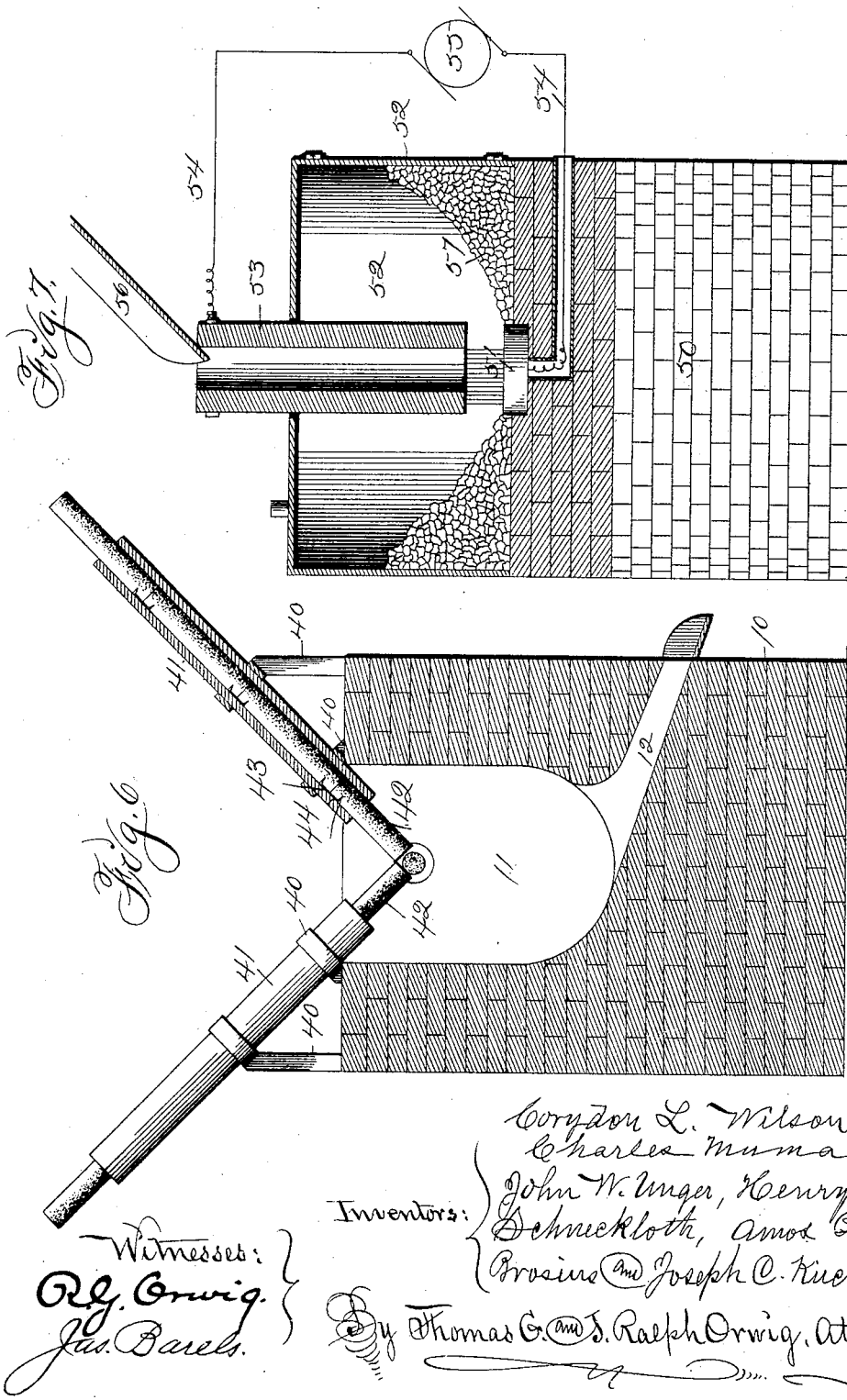

CORYDON L. WILSON, CHARLES MUMA, JOHN W. UNGER, HENRY SCHNECK-
LOTH, AMOS P. BROSIUS, AND JOSEPH C. KUCHEL, OF HOLSTEIN, IOWA.

METHOD OF AND APPARATUS FOR PRODUCING CALCIUM CARBID.

SPECIFICATION forming part of Letters Patent No. 601,366, dated March 29, 1898.

Application filed February 13, 1897. Serial No. 623,331. (No model.)

*To all whom it may concern:*

Be it known that we, CORYDON L. WILSON, CHARLES MUMA, JOHN W. UNGER, HENRY SCHNECKLOTH, AMOS P. BROSIUS, and JOSEPH C. KUCHEL, citizens of the United States, residing at Holstein, in the county of Ida and State of Iowa, have invented a new and useful Method of and Apparatus for Producing Calcium Carbid, of which the following is a specification.

This invention relates to that process of producing calcium carbid in which a mixture of lime and carbon is subjected to the heat of an electric arc. Heretofore this process has usually been practiced by causing a mixture of lime and carbon to be placed between and around adjacent ends of two electrodes and then causing a current of electricity to pass through the electrodes to form an arc between them, to thereby melt the mixture, and then causing said electrodes, or one of them, to be gradually withdrawn as the mixture becomes a molten mass, to thereby admit more of the mixture and thus reduce only a portion of the entire mixture to a liquid state. By the use of this process it has been found practically impossible to bring all of the mixture directly within the arc. Hence part of it must be melted, if melted at all, by contact with the molten mass. It has been found, further, in practicing this process that all of the mixture is not melted, but part of it is inextricably embedded in the finished product and by its presence reduces the value and efficiency of the product. A further difficulty has been encountered in practicing this process in that the molten product will adhere with great tenacity to the receptacle in which it is melted.

Our object is, first, to provide a process for reducing lime and carbon, in the practice of which process lime and carbon are fed to the electrodes in a cleanly and convenient manner.

Our object is further to provide a process for reducing lime and carbon, in the practice of which process the resultant product is completely, perfectly, and thoroughly reduced at all times. Thus when the electric current is unavoidably stopped none of the product is wasted.

A further object is to provide a process of reducing lime and carbon in which the finished product has no incrustation of unreduced or partly-reduced lime and carbon and in which said product will not adhere to the receptacle in which it is reduced.

A further object is to provide a process for reducing lime and carbon, in the practice of which the full power of the electric current may be utilized at all times.

A further object is to provide an electric furnace of this class in which the substance to be reduced will not pass beyond the arc until it has been melted by the heat of the arc, to thereby prevent the passage of any amount of unreduced lime and carbon into the receptacle which holds the finished product.

A further object is to provide an improved apparatus for producing calcium carbid.

Our invention consists in the arrangement and combination with each other of the relative steps in the reduction of lime and carbon to the finished product of calcium carbid, and, further, in the construction, arrangement, and combination of the various parts of the device, as hereinafter set forth, pointed out in our claims, and illustrated in the accompanying drawings, in which—

Figure 1 shows a vertical sectional view of the apparatus whereby this process may be conducted. Fig. 2 shows a top or plan view of the same apparatus. Fig. 3 shows a vertical sectional view of a modified form of apparatus by which our process may be practiced. Fig. 4 shows a top or plan view of the same. Fig. 5 shows a vertical sectional view of another modified form of apparatus whereby this process may be practiced. Fig. 6 shows a vertical sectional view of another form of apparatus by which the same process may be conducted. Fig. 7 shows a vertical sectional view of still another modification by which the same process may be practiced. Fig. 8 shows a longitudinal sectional view of a number of pieces of lime and carbon compressed into elongated blocks and contained within a tubular wrapper.

Referring to the accompanying drawings, we shall first set forth the construction shown in Figs. 1 and 2 and embodying our preferred form of apparatus with which the process may be carried on.

The reference-numeral 10 is used to indicate a base having a bowl-shaped central opening 11, from which a duct 12 leads to a discharge-point exterior to the base.

The reference-numerals 13 are used to indicate two tubes or sleeves extended in an approximately horizontal position through the walls of the base, with their inner ends in alinement and adjacent to each other near the central portion of the basin 11. These tubes or sleeves 13 are made of some material which is a good conductor of electricity, and fixed to the exterior end of each tube is an electric cable 14, which cable leads to the source of electrical supply 15. An arc is struck between the electrodes 13 when a current of electricity is passed from the dynamo or source of supply 15 to the electrodes. These electrodes may be moved with relation to each other by the hand-wheels 18 in such proximity that a perfect arc may be produced.

We have provided means for adjusting the electrodes 13 relative to each other as follows: The reference-numeral 16 indicates a bracket fixed to the exterior wall of the base and having rotatably mounted therein a screw-shaft 17, on one end of which a hand-wheel 18 is fixed, and the other end thereof is seated in an arm 19, which in turn is fixed to the outer end of the electrode. A similar device is applied to each electrode. Hence an operation of the hand-wheel 18 will move the electrode in a horizontal plane relative to the opposite electrode.

In Fig. 8 the reference-numeral 20 is applied to the elongated block, which is composed of a mixture of lime and carbon, which is formed by first pulverizing lime and carbon and then subjecting the same to a pressure to form it into blocks of this shape. This produces firm sticks without the use of a binder. These sticks thus formed are of sufficient strength to permit hooks such as are shown in Fig. 5 to be placed in their ends for the purpose of connecting a series of these blocks. They must, however, be used soon after they have been compressed into stick form, for the reason that the action of the air upon them will cause them to disintegrate after the manner of "air-slaked lime."

The reference-numeral 21 indicates a sleeve which may be made of any suitable material—such, for instance, as pasteboard, asbestos, or sheet metal—and this sleeve is extended from a point a considerable distance from one end of the block 20 to a point the same distance beyond the other end of the said block. Thus when a number of the blocks are brought together the joints in the blocks and the joints in the casing will not coincide. In practicing our method by use of this apparatus we combine a series of these blocks and introduce two of these series into the ends of the hollow electrodes 13 and cause them to meet between the ends of the electrodes 13. We then cause a current of electricity to flow through the electrodes and to form an arc between their adjacent ends. The intense heat at this place causes the sticks or blocks of lime and carbon, together with the wrappers thereon, to melt and drop into the basin 11. As fast as the sticks of lime and carbon are melted away at the inner ends of the electrodes other sticks, each having a sleeve thereon, are inserted in the outer ends of the electrodes, and the sleeve of each is made to overlap the block adjacent thereto. Hence a substantially continuous supply of lime and carbon is fed to the arc formed between the electrodes, and the end of one stick or block of lime and carbon is prevented from falling off into the basin 11 before it has been melted on account of the sleeve of the adjacent block or stick supporting it until the sleeve itself is consumed.

The apparatus illustrated in Figs. 3 and 4 comprises a base, a central opening, and a duct leading therefrom exactly similar to that of the apparatus just described. Two electrodes 22 are fixed in the walls of the base in a horizontal plane and in alinement with each other, with their ends in such proximity as to produce an arc between them when a current of electricity is passed through them. Sleeves 23 are preferably mounted in these walls to receive the said electrodes. Electric cables 24 are fixed direct to the outer ends of the electrodes and lead to the source of electrical supply 25. The numeral 26 is used to indicate hollow tubes placed in the walls of the base in the same horizontal plane as the electrodes 22, but at exactly right angles thereto. Lime and carbon in stick or block form, preferably as shown in Fig. 8, are fed through these tubes 26 to pass between the electrodes 22. In practicing our method by the use of this apparatus we first establish an electric arc, in a well-known manner, between the electrodes 22. Then the lime and carbon in stick or block form are forced through one or both of the sleeves 26 until the end or ends thereof pass between the electrodes, or rather through the arc formed thereby, where they are melted and run into the basin 11.

The apparatus for practicing our process (illustrated in Fig. 5) is similar to the apparatus just previously described, except that one of the electrodes is provided with means for adjusting it horizontally as follows: The numeral 30 indicates a bracket fixed to the furnace-wall and having a screw-shaft 31 rotatably mounted therein and provided with a hand-wheel 32 on its one end and having its other end passing through a screw-threaded arm 33, which in turn is fixed to the electrode. In this form there are no tubes through which the lime and carbon are fed to the arc. We have, however, provided a means whereby a series of sticks or blocks of lime and carbon may be connected in such a way that they may be held in a vertical position with the lower end of one of the sticks or blocks extending between the electrodes or in the arc.

This means comprises blocks 34, made of a mixture of lime and carbon and compressed into this shape, and also provided with a number of transverse openings 35 and a number of metallic hooks 36, placed in the ends of said sticks or blocks, whereby the sticks may be connected and held together. The transverse openings 35, formed in the sticks of lime and carbon, provide means whereby the heat of the electric arc may take effect upon every particle of the lime and carbon more rapidly than would be possible if the sticks were solid, and hence a greater quantity of lime and carbon provided with these openings may be melted in an arc of given intensity than would be possible if the sticks were solid. In practicing our method by the use of this apparatus the arc is established between the electrodes in the ordinary way. A series of the blocks 34 are connected together by means of the hooks 36 and the lower end of the lower block is kept between the electrodes or in the arc, and as fast as it is melted away the blocks are fed downwardly by gravity, so that a portion of the lime and carbon remains between the electrodes at all times. The material of which the hooks are formed is melted as fast as it is passed between the electrodes, and the presence of this slight amount of metal in the finished calcium carbid is so inconsiderable as not to be noticed.

In the modification shown in Fig. 6 the furnace proper is of identical construction with the furnace shown in Fig. 5. Hence a repetition of the description is omitted. We have, however, provided means whereby the lime and carbon may be fed to the space between the electrodes or the arc automatically as follows: The reference-numeral 40 is used to indicate arms or brackets mounted on top of the furnace-wall to support tubes 41, which are placed on an incline approximating forty-five degrees and which have their lower ends extending to the point adjacent to the space between the electrodes and at right angles thereto. The other ends of the sleeves may be projected as far as found desirable. The reference-numeral 42 is used to indicate the blocks of lime and carbon compressed, as before described, and the numeral 43 indicates coupling devices having hooked ends 44, one of which is placed in the end portion of one of the blocks 42 and the other in the end portion of an adjacent block at the upper edge thereof. Each of the tubes 41 is filled with a series of the blocks 42, connected by means of the hooks 44 with each other. The lower ends of the two series of blocks are arranged to meet at a point between the electrodes or in the arc. It is obvious that as fast as the lime and carbon of which these blocks are formed are melted away the blocks will drop by gravity to replace the part burned away; but it is also obvious that one of the series of blocks cannot pass beyond the other. Hence there will always be a quantity of the lime and carbon in the arc. The connecting-rods 43 serve to support the ends of the blocks after they have passed beyond the lower ends of the sleeves, it being impractical to extend the sleeves very close to the electrodes on account of the intense heat of the arc tending to consume any material which is placed within its direct influence.

The form of apparatus shown in Fig. 7 for carrying out our process comprises a base 50, having an electrode 51 mounted in its top, a metal casing 52 above the base, a tubular electrode 53, supported in a vertical position above the electrode 51, and electric cables 54, leading from the electrodes 51 and 53 to the source of electrical supply 55. 56 indicates a chute leading to the opening in the hollow electrode 53. 57 indicates a quantity of calcium carbid in pulverized or granular form placed on the base and around the sides of the chamber at the top of the base 50. In practicing our process by the use of this apparatus we place a mixture of lime and carbon in granular or pulverized form in the chute 56 to pass through the electrode 53 and into the space between the electrode or the arc. It is obvious that upon the completion of the current the lime and carbon between the electrodes will be melted and will run off into the casing 52 and commingle with the pulverized calcium carbid 57. When the casing is removed, the calcium carbid may be readily taken from the furnace and broken up into the desired size, it being obvious that there can be no incrustation on the finished product of crude or imperfectly-reduced lime and carbon. It is obvious, further, that the molten product will not adhere to the base or to the casing because of the layer of pulverized calcium carbid which protects it from the base and casing.

We are aware that heretofore a method of reducing ores, &c., was practiced in which an electric arc was established and a mixture of ores in pulverized or granular form was caused to drop downwardly through the electrode and in its passage therethrough was melted or reduced. However, in the practice of such a method it is obvious that under certain conditions it is conceivable that the ores would not be melted thoroughly in their passage through the arc, and, furthermore, when the electric current is temporarily cut off certain portions of the ore would also pass through without being melted. By feeding the substance to be melted or reduced into the arc in block or stick form in which a series of blocks or sticks are connected it is readily seen that none of the material may pass beyond the electrode until it has been melted, and in the event of the current being suddenly cut off none of the material will pass beyond the electrode into the receiver, and even if the operation of feeding the material should continue a short time after the electric current has been discontinued the material will not be melted, and hence when the current is again established the material may be drawn from the arc and then melted upon the reëstablishment of the current.

We do not desire to be understood as limiting ourselves to the use of any one of the apparatuses shown and described, inasmuch as the process of placing or introducing a mixture of lime and carbon in the electric arc may be practiced by hand or in the use of very simple means. We have shown and described such apparatus for carrying out our process as we believe is best adapted for practical use, and the number and variety of the means shown are thought to be conclusive evidence that the invention cannot be properly covered by claims on the mechanical construction alone.

We are aware that heretofore electric furnaces for similar uses have been provided with substances in stick form which have been used as electrodes and the substances melted and permitted to run from the arc as fast as the electrodes were fed toward each other, and in such cases there was no possibility of any of the substance to be reduced passing out of the arc until melted. We are also aware that furnaces of this class have been made heretofore in which an arc was first established by means of suitable electrodes and then the substances to be melted fed to the arc; but we are not aware that there has ever been a furnace of this class constructed in which two electrodes made of suitable material with the object of establishing an arc between them of a maximum intensity with a minimum of applied electric current and then the substance to be melted placed in the arc between the electrodes and there held until melted.

We claim—

1. The process of producing calcium carbid, which consists in first causing the base and sides of the furnace, or the receptacle in which the process is carried on, to be lined with calcium carbid in granular form, and then causing a mixture of lime and carbon, to be fed into the space between the electrodes or the said arc so that the molten product may run into the base and sides so covered with calcium carbid.

2. The process of producing calcium carbid, which consists in first causing lime and carbon, or their equivalents to be pulverized, then causing them to be commingled, then causing the mixture to be compressed into blocks or sticks, then causing the blocks or sticks to be connected, then causing the furnace or receptacle in which the lime and carbon are to be melted to be lined with pulverized or granulated calcium carbid, then causing an electric arc to be established, and finally causing the sticks or blocks to be fed into the said arc.

3. An apparatus for producing calcium carbid, comprising a furnace, a lining of calcium carbid loosely arranged within the furnace-wall, means for establishing an electric arc within the furnace and means for feeding lime and carbon into said arc, for the purposes stated.

CORYDON L. WILSON.
CHARLES MUMA.
JOHN W. UNGER.
HENRY SCHNECKLOTH.
AMOS P. BROSIUS.
JOSEPH C. KUCHEL.

Witnesses:
R. P. WHEATLEY,
HENRIETTA HASS.